(12) United States Patent
Sweeney

(10) Patent No.: US 11,691,351 B2
(45) Date of Patent: Jul. 4, 2023

(54) HIGH FREQUENCY ADHESIVE BONDING

(71) Applicant: Essentium, Inc., Pflugerville, TX (US)

(72) Inventor: Charles Brandon Sweeney, Pflugerville, TX (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 25 days.

(21) Appl. No.: 16/605,395

(22) PCT Filed: Jul. 29, 2019

(86) PCT No.: PCT/US2019/043894
§ 371 (c)(1),
(2) Date: Oct. 15, 2019

(87) PCT Pub. No.: WO2020/028239
PCT Pub. Date: Feb. 6, 2020

(65) Prior Publication Data
US 2021/0339481 A1   Nov. 4, 2021

Related U.S. Application Data

(60) Provisional application No. 62/711,763, filed on Jul. 30, 2018.

(51) Int. Cl.
*B29C 65/48* (2006.01)
*B29C 65/52* (2006.01)
(Continued)

(52) U.S. Cl.
CPC ...... *B29C 65/4835* (2013.01); *B29C 65/4855* (2013.01); *B29C 65/525* (2013.01); *A43D 25/20* (2013.01); *B29L 2031/504* (2013.01)

(58) Field of Classification Search
CPC ...... A43B 1/0009; A43D 25/20; B29C 65/04; B29C 65/3612; B29C 65/3616;
(Continued)

(56) References Cited

U.S. PATENT DOCUMENTS 2,222,615 A   11/1940   Hart, Jr.
2,379,059 A    6/1945   Ashley et al.
(Continued)

FOREIGN PATENT DOCUMENTS

WO   9015110 A1   12/1990
WO   2015147939 A1   10/2015
WO   2018089785 A1   5/2018

OTHER PUBLICATIONS

Extended European Search Report in 19845498.5, European Patent Office, dated Apr. 26, 2022.
(Continued)

*Primary Examiner* — Philip C Tucker
*Assistant Examiner* — Brian R Slawski
(74) *Attorney, Agent, or Firm* — Vivacqua Crane, PLLC

(57) ABSTRACT

A system and method for bonding a first layer of material to a second layer of material includes a first electrically conductive plate, a second electrically conductive plate spaced apart from the first electrically conductive plate. The second electrically conductive plate is electrically grounded. A high frequency generator in electrical communication with the first electrically conductive plate supplies high frequency electrical signals to the first electrically conductive plate. An adhesive applied to one of the first and second layers of material has an electromagnetic susceptor material that when subjected to the electric field heats the adhesive to an adhesive curing temperature to bond the first layer of material to the second layer of material. A clamping mechanism applies pressure to one of the first and second layers of material to maintain contact between the first and second layers until an adhesive cure time has lapsed.

12 Claims, 2 Drawing Sheets

(51) Int. Cl.
*A43D 25/20* (2006.01)
*B29L 31/50* (2006.01)

(58) Field of Classification Search
CPC ............ B29C 65/3676; B29C 65/3864; B29C 65/4815; B29C 65/4835; B29C 65/4855; B29C 65/4885; B29C 65/489; B29C 65/525; B29C 66/1122; B29C 66/232; B29C 66/234; B29C 66/242; B29C 66/5326; B29C 66/71; B29C 66/712; B29C 66/7392; B29C 66/7484; B29C 66/8242; B29C 66/8322; B29L 2031/504; C09J 2301/416; C09J 5/06
USPC ............ 156/60, 242, 244.11, 244.17, 272.2, 156/272.4, 275.7, 290, 291, 379.6; 12/142 F, 33.2; 219/766
See application file for complete search history.

(56) References Cited

U.S. PATENT DOCUMENTS

| | | | |
|---|---|---|---|
| 2,412,982 A | 12/1946 | Hart | |
| 2,498,027 A | 2/1950 | Brown | |
| 2,633,586 A * | 4/1953 | Osborn | A43D 25/20 12/146 D |
| 2,644,966 A | 7/1953 | Juhola | |
| 3,444,571 A | 5/1969 | Harriman | |
| 3,574,031 A | 4/1971 | Heller, Jr. et al. | |
| 3,900,360 A * | 8/1975 | Leatherman | B32B 27/08 156/272.4 |
| 5,277,737 A * | 1/1994 | Li | B29C 65/4835 156/274.8 |
| 5,328,539 A | 7/1994 | Sato | |
| 6,007,677 A * | 12/1999 | Skuse | B65D 19/0095 156/583.91 |
| 10,414,147 B2 | 9/2019 | Sweeney et al. | |
| 2001/0035406 A1 | 11/2001 | Ryan et al. | |
| 2005/0274455 A1* | 12/2005 | Extrand | B29C 66/1122 428/323 |
| 2014/0000043 A1* | 1/2014 | Boardman | H05B 6/105 12/107 R |
| 2014/0356592 A1* | 12/2014 | Colella | B44C 1/1712 428/201 |
| 2015/0174821 A1* | 6/2015 | Levine | B29C 64/112 264/401 |
| 2016/0001535 A1 | 1/2016 | Fischer et al. | |
| 2017/0159869 A1 | 6/2017 | Parker | |
| 2019/0344502 A1 | 11/2019 | Sweeney et al. | |
| 2020/0070416 A1 | 3/2020 | Sweeney et al. | |
| 2020/0298479 A1 | 9/2020 | Sweeney et al. | |
| 2020/0317957 A1 | 10/2020 | Sweeney et al. | |

OTHER PUBLICATIONS

International Search Report and Written Opinion in PCT/US19/43894, International Searching Authority WIPO, dated Oct. 22, 2019.

Sweeney, et al., Electromagnetic Energy Coupled to Nanomaterial Composites for Polymer Manufacturing, (Doctoral Dissertation, Texas A & M University May 7, 2018) < https://hdl.handle.net/1969.1/188880> (accessed Dec. 18, 2020).

* cited by examiner

HIGH FREQUENCY ADHESIVE BONDING

CROSS REFERENCE TO RELATED APPLICATIONS

This application is a national stage completion of PCT/US2019/043894, filed on Jul. 29, 2019, which claims the benefit of U.S. Provisional Application No. 62/711,763 filed Jul. 30, 2018. The disclosures of the above applications are incorporated herein by reference.

FIELD

The present disclosure relates generally to bonding layers of materials with an adhesive system using an electromagnetic field.

BACKGROUND

The statements in this section merely provide background information related to the present disclosure and may or may not constitute prior art.

Typical adhesive systems are pressure and/or heat cured with ovens, infrared heat, or steam. For example, in shoe manufacturing, the entire volume of the shoe is heated up to transfer heat to an adhesive to cure the adhesive to form a bond between the layers of the shoe. Materials used in footwear are not typically good conductors of heat and therefore take time to heat the core of the shoe where the adhesive is located. Furthermore, the materials used in footwear can be damaged by excessive heat required to cure the adhesive.

Thus, while current adhesive systems achieve their intended purpose, there is a need for a new and improved system and method for bonding materials, for example in shoe manufacturing. The new and improved method should use the adhesive itself to intrinsically generate the heat required for curing to prevent damage to surrounding material layers of the shoe. Moreover, the new and improved method should be faster and more energy efficient than conventional methods since the adhesive will be directly heated rather than indirectly heated by the surrounding portions of the shoe.

SUMMARY

According to several aspects, a system for bonding a first layer of material to a second layer of material is provided. The system includes a first electrically conductive plate, a second electrically conductive plate spaced apart from the first electrically conductive plate. The second electrically conductive plate is electrically grounded. A high frequency generator in electrical communication with the first electrically conductive plate supplies high frequency electrical signals to the first electrically conductive plate to produce an electric field between the first and second electrically conductive plates. An adhesive is applied to one of the first and second layers of material. The adhesive has an electromagnetic susceptor material that when subjected to the electric field heats the adhesive to an adhesive curing temperature. The system further includes a clamping mechanism for applying pressure to one of the first and second layers of material to maintain contact between the first and second layers until an adhesive cure time has lapsed.

In another aspect of the present disclosure, at least one of the first and second electrically conductive plates are formed to match the shape of one of the first and second layers of material.

In another aspect of the present disclosure, the first electrically conductive plate is parallel with second electrically conductive plate.

In another aspect of the present disclosure, the high frequency generator produces a radio frequency selected from the group including 6.78 MHz, 13.56 MHz, 27.12 MHz, 40.68 MHz and 433.92 MHz or other frequencies such as microwave frequencies of 915 MHz, 2.45 GHz, and 5.8 GHz.

In another aspect of the present disclosure, the adhesive is applied to one of the first and second material layers in a predetermined pattern.

In another aspect of the present disclosure, the predetermined pattern of adhesive is in the form of a line on the periphery of one of the first and second material layers.

In another aspect of the present disclosure, the predetermined pattern of adhesive is in the form of a layer of adhesive covering substantially an entire surface of one of the first and second material layers.

In another aspect of the present disclosure, the predetermined pattern of adhesive is in the form of a plurality of intersecting lines on a surface of one of the first and second material layers.

In another aspect of the present disclosure, the predetermined pattern of adhesive is in the form of a plurality of concentric rings on a surface of one of the first and second material layers.

In another aspect of the present disclosure, the electromagnetic susceptor material is a plurality of carbon nanotubes dispersed in the adhesive.

In another aspect of the present disclosure, a method for bonding a first layer of material to a second layer of material is provided. The method includes providing a first electrically conductive plate and a second electrically conductive plate spaced apart from the first electrically conductive plate. The second electrically conductive plate is electrically grounded. Moreover, the method generates a high frequency electrical signal to produce an electric field between the first and second electrically conductive plates using a high frequency generator in electrical communication with the first electrically conductive plate. An adhesive is dispensed on a surface of one of the first and second layers of material. The adhesive has an electromagnetic susceptor material that when subjected to the electric field heats the adhesive to an adhesive curing temperature. Pressure is applied to one of the first and second layers of material using a clamping mechanism to maintain contact between one of the first and second layers with the other of the first and second layers until an adhesive cure time has lapsed.

In another aspect of the present disclosure, providing a first and second electrically conductive plate further includes providing a first and second electrically conductive plate formed to match the shape of one of the first and second layers of material.

In another aspect of the present disclosure, providing a first and second electrically conductive plate further includes providing the first electrically conductive plate parallel with second electrically conductive plate.

In another aspect of the present disclosure, generating a high frequency electrical signal further includes controlling the high frequency generator to produce a radio frequency selected from the group including 6.78 MHz, 13.56 MHz, 27.12 MHz, 40.68 MHz and 433.92 MHz or other frequencies such as microwave frequencies of 915 MHz, 2.45 GHz, and 5.8 GHz.

In another aspect of the present disclosure, dispensing an adhesive on a surface of one of the first and second layers of material further includes applying the adhesive to one of the first and second material layers in a predetermined pattern.

In another aspect of the present disclosure, dispensing an adhesive on a surface of one of the first and second layers of material further includes applying the adhesive in the form of a line on the periphery of one of the first and second material layers.

In another aspect of the present disclosure, dispensing an adhesive on a surface of one of the first and second layers of material further includes applying the adhesive in the form of a layer of adhesive covering substantially an entire surface of one of the first and second material layers.

In another aspect of the present disclosure, dispensing an adhesive on a surface of one of the first and second layers of material further includes applying the adhesive in the form of a plurality of intersecting lines on a surface of one of the first and second material layers.

In another aspect of the present disclosure, dispensing an adhesive on a surface of one of the first and second layers of material further includes applying the adhesive in the form of a plurality of concentric rings on a surface of one of the first and second material layers.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present invention provides a system for bonding a first layer of material to a second layer of material. The material layers may be selected from a variety of material compositions. A variety of different products may be formed or manufactured with the material layers such as shoes or sneakers, for example.

Figure 1:
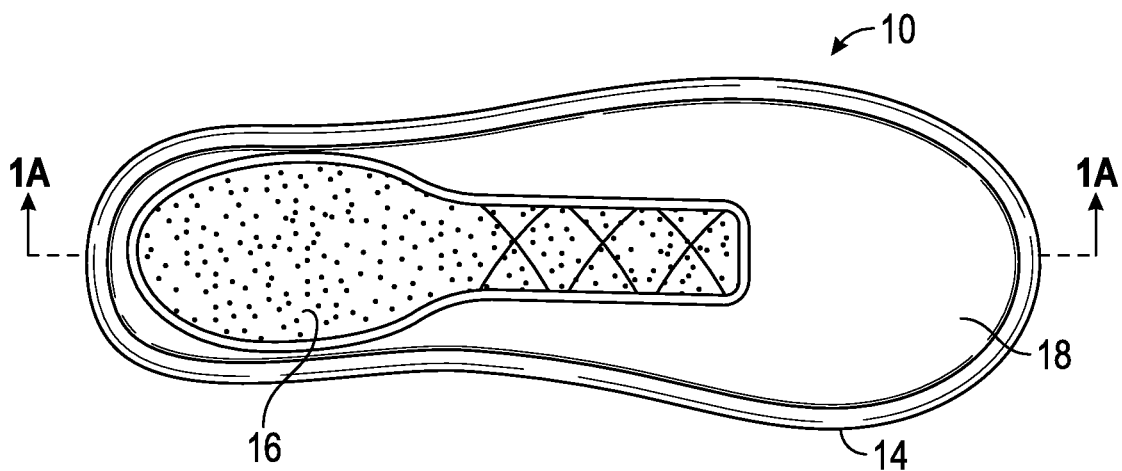
FIGS. 1 and 1a, are a top and side view of a shoe or sneaker and the system for bonding a first layer of material to a second layer of material are illustrated, in accordance with one aspect of the invention.
Figure 1A:
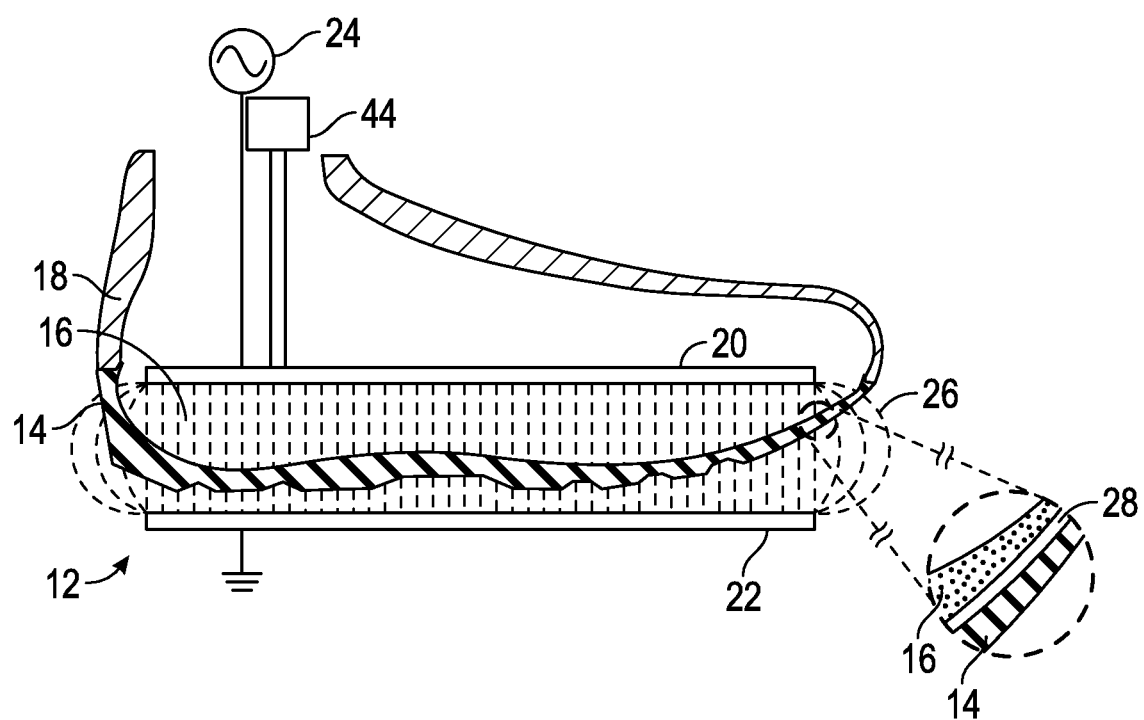

Referring to FIGS. 1 and 1a, a top and side view of a shoe or sneaker 10 and the system 12 for bonding a first layer of material to a second layer of material are illustrated, in accordance with one aspect of the invention. Sneaker 10, for example, is a product that may be manufactured using the system 12 for bonding a first layer of material to a second layer of material.

Sneaker 10 has an outsole 14, a midsole 16, and an upper 18. The outsole 14 may also be referred to as the sole and is the bottommost part of the sneaker 10 that comes in direct contact with the ground. The outsole 14 may be made from a variety of materials, including leather and rubber. Typically the outsole 14 is the portion of the sneaker 10 that includes a tread 20 that provides traction on a surface on which a wearer of the sneaker 10 is traversing. Certain types of outsoles 14 provide more traction than others by using specific tread 20 materials or designs. The midsole 16 is a layer of material disposed between an insole (not shown) and the outsole 14 of sneaker 10. The midsole 16 is designed and contoured to absorb shock. Midsole 16 is typically made of ethyl vinyl acetate (EVA). In one aspect of the present invention, the midsole 14 is made of a first material layer and the outsole 14 is made of a second material layer. The midsole 16, in another aspect of the present invention, is a different material composition than the outsole 14. The upper 18 is the part or parts of the sneaker 10 that cover the toes, the top of the foot, the sides of the foot, and the back of the heel. Depending on the style of the shoe, the upper 18 is cut or molded as a single piece or the upper 18 is comprised of many pieces stitched together.

With continuing reference to FIG. 1a, system 12 for bonding the midsole 16 to the outsole 14 is illustrated, in accordance with the present invention. System 12 for bonding the midsole 16 to the outsole includes a first electrically conductive plate 20 and a second electrically conductive plate 22. Second electrically conductive plate 22 is spaced apart from the first electrically conductive plate 20. In an aspect of the present invention, the first electrically conductive plate 20 is parallel with second electrically conductive plate 22. In another aspect of the present invention, one or both of the electrically conductive plates 20, 22 are formed or shaped to match the shape of the midsole 16 or the outsole 14, respectively. The second electrically conductive plate 22 is electrically grounded.

System 12 further includes a high frequency generator 24. High frequency generator 24 is in electrical communication with the first electrically conductive plate 20 and supplies high frequency electrical signals to the first electrically conductive plate 20 to produce an electric field 26 between the first and second electrically conductive plates 20, 22. The high frequency generator 24 produces, for example, a radio frequency signal selected from the Industrial, Scientific, Medicine band (ISM band) including: 6.78 MHz, 13.56 MHz, 27.12 MHz, 40.68 MHz and 433.92 MHz or other frequencies such as microwave frequencies of 915 MHz, 2.45 GHz, and 5.8 GHz. The outsole 14 and midsole 16 are disposed between the first electrically conductive plate 20 and second electrically conductive plate 22 such that the outsole 14 and midsole 16 are exposed along their entire length to the electric field that is produced between the first and second electrically conductive plates 20, 22.

Figure 2:
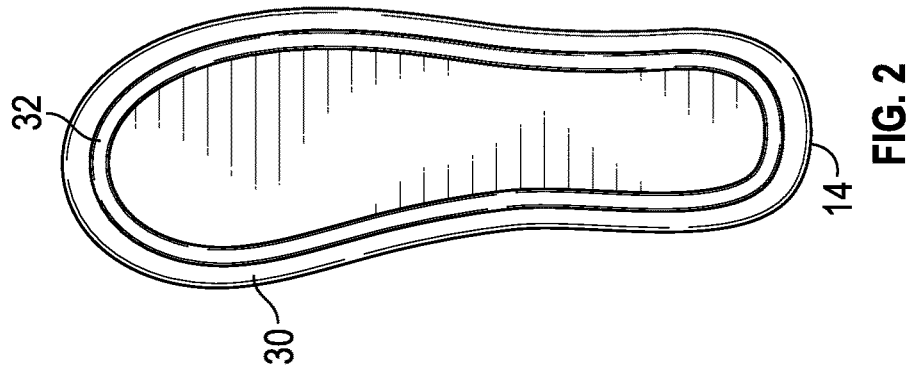
FIG. 2 is a top view of the top surface of the outsole with adhesive dispensed on the surface of the outsole in a first predetermined pattern, in accordance with an aspect of the present invention.

An adhesive 28 is applied to either the outsole 14 (i.e. the first layer of material) or the midsole 16 (i.e. the second layer of material). The adhesive 28 has an electromagnetic susceptor material (not shown) that when subjected to the electric field 26 heats the adhesive 28 to an adhesive curing temperature. Adhesive 28 has, for example, a polymer component and a nanomaterial susceptor component, where the polymer component is selected from the following group: epoxies, polyurethanes, polyesters, polyacrylates, solvent-polymer adhesives, contact adhesives, hot-melt adhesives, thermoplastic adhesives. The electric field 26 may be applied with capacitive coupling that is efficiently coupled to the adhesive. After a period of heating and then after cooling the adhesive 28 bonds the midsole 16 to the outsole 14. The materials used in the rest of the sneaker are generally low-loss dielectric materials and do not heat in when exposed to the electric field 26. The nanomaterial susceptor component or electromagnetic susceptor material is, for example, selected from the following group: carbon nanotubes, carbon black, buckyballs, graphene, superparamagnetic nanoparticles, magnetic nanoparticles, metallic nanowires, semiconducting nanowires, quantum dots, polyaniline (PANI), poly3,4-ethylenedioxythiophene polystyrenesulfonate, and combinations thereof. The weight percent of electromagnetic susceptor material in the polymer adhesive is generally between 0.1% and 10%, specifically between 0.5% and 4% such that the nanomaterial/adhesive system is tuned to respond energetically to the electromagnetic frequency selected. The electromagnetic susceptor materials dispersed into the adhesive 28 causes the adhesive 28 to act as a heat source for curing the adhesive 28 while allowing the rest of the shoe to remain cool until the adhesive 28 is internally heated to its cure temperature. In another example, adhesive 28 is a 3D printer filament made from one of the aforementioned adhesive systems. The 3D printer filament may be a monofilament of the nanomaterial/polymer adhesive mixture, or it may be a multilayer structure with a nanomaterial-rich coating or core made during or after the filament production process. The nanomaterial-rich coating has a thickness of between 0.005% and 30% of diameter of the polymer filament. For example, the nanomaterial-rich coating has a thickness between about 100 nm and 0.5 mm. In one example, the coating includes between 1 wt % and 50 wt % of carbon nanotubes or other nanomaterial electromagnetic susceptor material. In another example, the coating includes between 3 wt % and 10 wt % of carbon nanotubes or other nanomaterial electromagnetic susceptor material. Preferably, with a multilayer coextrusion die is used to manufacture the filament. Moreover, the present invention contemplates dispensing adhesive 28, in the form of a 3D filament, using an automated dispensing system such as a 3D printer or the like. In another example, the filament and nanomaterial is as described in international patent application WO2015147939A1, hereby incorporated by reference. Referring now to FIG. 2, a top view of the top surface 30 of the outsole 14 is illustrated with adhesive 28 dispensed on the surface 30 of the outsole 14 in a first predetermined pattern, in accordance with an aspect of the present invention. The adhesive 28 is applied to the top surface 30 of the outsole 14 in the form of a line 32 on the periphery of the top surface 30.

Figure 3:
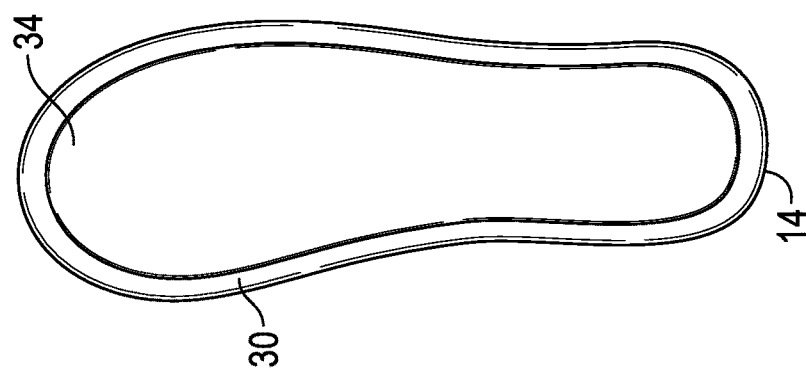
FIG. 3 is a top view of the top surface of the outsole with adhesive dispensed on the surface of the outsole in a second predetermined pattern, in accordance with an aspect of the present invention.

Referring now to FIG. 3, a top view of the top surface 30 of the outsole 14 is illustrated with adhesive 28 dispensed on the surface 30 of the outsole 14 in a second predetermined pattern, in accordance with an aspect of the present invention. The second predetermined pattern of adhesive 28 is in the form of a layer 34 of adhesive 28 covering substantially the entire surface 30 of the midsole 14.

Figure 4:
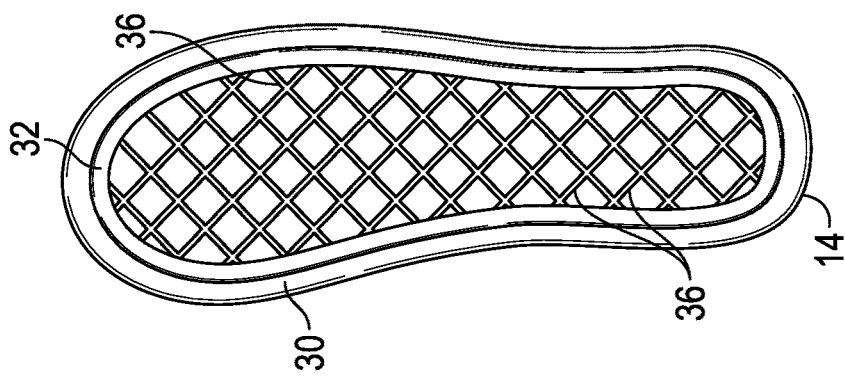
FIG. 4 is a top view of the top surface of the outsole with adhesive dispensed on the surface of the outsole in a third predetermined pattern, in accordance with an aspect of the present invention.

Referring now to FIG. 4, a top view of the top surface 30 of the outsole 14 is illustrated with adhesive 28 dispensed on the surface 30 of the outsole 14 in a third predetermined pattern, in accordance with an aspect of the present invention. The third predetermined pattern of adhesive 28 is in the form of line 32 on the periphery of the top surface 30 and a plurality of intersecting lines 36 disposed within the line 32 on surface 30 of midsole 14.

Figure 5:
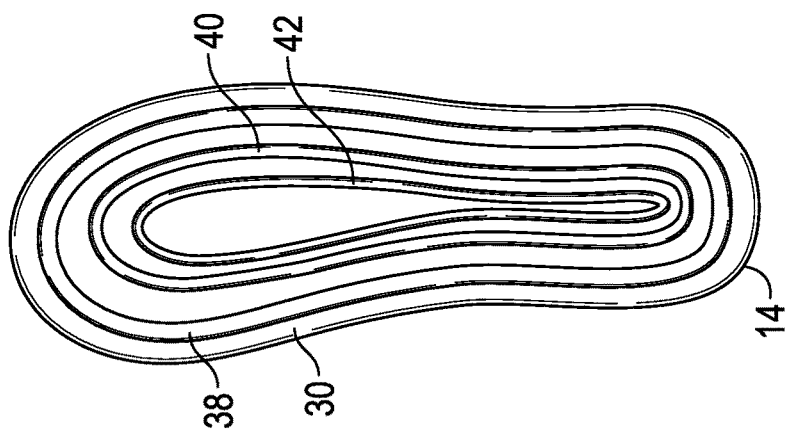
FIG. 5 is a top view of the top surface of the outsole with adhesive dispensed on the surface of the outsole in a fourth predetermined pattern, in accordance with an aspect of the present invention.

Referring now to FIG. 5, a top view of the top surface 30 of the outsole 14 is illustrated with adhesive 28 dispensed on the surface 30 of the outsole 14 in a fourth predetermined pattern, in accordance with an aspect of the present invention. The fourth predetermined pattern of adhesive 28 is in the form of a plurality of concentric rings 38, 40 and 42 dispensed on surface 30 of outsole 14. Ring 38 is a line of adhesive 28 that is dispensed in the form of a ring or oval on the periphery of the top surface 30. Ring 40 is a line of adhesive 28 that is dispensed in the form of a ring or oval inward of ring 38 on the top surface 30. Ring 42 is a line of adhesive 28 that is dispensed in the form of a ring or oval inward of ring 40 on the top surface 30.

Moreover, with reference to FIG. 1, adhesive bonding system 12 further includes a clamping mechanism 44, in accordance with one aspect of the present invention. Clamping mechanism 44 is configured to apply pressure to the outsole 14 or midsole 16 to maintain contact between the outsole 14 and midsole 16 until an adhesive cure time has lapsed. Clamping mechanism 44, in one aspect of the present invention, is a hydraulic cylinder acting on one of the first and second electrically conductive plates 20,22 to press and hold the plate against the outsole 14 or midsole 16 while the other plate is held stationary.

The present invention further includes a method for bonding a first layer of material to a second layer of material. The method starts with providing a first electrically conductive plate spaced apart from a second electrically conductive plate. The second electrically conductive plate is electrically grounded. Further, the method of the present invention includes generating a high frequency electrical signal to produce an electric field between the first and second electrically conductive plates using a high frequency generator in electrical communication with the first electrically conductive plate. The method includes dispensing an adhesive on a surface of one of the first and second layers of material. The adhesive has an electromagnetic susceptor material that when subjected to the electric field heats the adhesive to an adhesive curing temperature. The electromagnetic susceptor material is, for example, a plurality of carbon nanotubes dispersed in the adhesive. The first and second layers of material are positioned between the first and second electrically conductive plates. Pressure is applied to one of the first and second layers of material using a clamping mechanism to maintain contact between one of the first and second layers with the other of the first and second layers until an adhesive cure time has lapsed.

The present invention contemplates that the first and second electrically conductive plates are formed to match the shape of one of the first and second layers of material. Moreover, in an aspect of the present invention the method includes providing the first electrically conductive plate parallel with second electrically conductive plate. The high frequency generator is controlled to produce a radio frequency signal selected from the group including 6.78 MHz, 13.56 MHz, 27.12 MHz, 40.68 MHz and 433.92 MHz or other frequencies such as microwave frequencies of 915 MHz, 2.45 GHz, and 5.8 GHz. After a period of heating through exposure of the adhesive and the first and second layers of material to the electric field the adhesive bonds the first layer of material to the second layer of material. The first and second layers of material are generally low-loss dielectric materials that do not heat up when exposed to the electric field and therefore are not susceptible to damage.

Advantageously, the electromagnetic susceptor materials dispersed into the adhesive causes the adhesive to act as a heat source for curing the adhesive while allowing the surrounding material layers to remain cool until the adhesive is internally heated to its cure temperature. Moreover, the method of the present invention is faster and more energy efficient than conventional methods since the adhesive will be directly heated rather than indirectly heated by the surrounding portions of the shoe.

The adhesive is applied to one of the first and second material layers in a predetermined pattern. For example, the adhesive is applied in the form of a line on the periphery of one of the first and second material layers. In another example, the adhesive is applied in the form of a layer of adhesive covering substantially an entire surface of one of the first and second material layers. In yet another example, the adhesive is applied in the form of a plurality of intersecting lines on a surface of one of the first and second material layers. In still another example, the adhesive is applied in the form of a plurality of concentric rings on a surface of one of the first and second material layers.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for bonding a first layer of material to a second layer of material, the method comprising:
   providing a first electrically conductive plate;
   providing a second electrically conductive plate spaced apart from the first electrically conductive plate wherein the second electrically conductive plate is electrically grounded;
   dispensing an adhesive on a surface of one of the first and second layers of material, wherein dispensing the adhesive comprises dispensing a filament and the adhesive has an electromagnetic susceptor material present in a coating on the filament that when subjected to an electric field heats the adhesive;
   generating a high frequency electrical signal to heat the adhesive between the first and second electrically conductive plates using a high frequency generator in electrical communication with the first electrically conductive plate; and
   applying pressure to one of the first and second layers of material using a clamping mechanism to maintain contact between one of the first and second layers with the other of the first and second layers.

2. The method of claim 1, wherein providing the first and second electrically conductive plates further comprises providing the first electrically conductive plate parallel with the second electrically conductive plate.

3. The method of claim 1, wherein generating the high frequency electrical signal further comprises controlling the high frequency generator to produce a radio frequency selected from the group consisting of 6.78 MHz, 13.56 MHz, 27.12 MHz, 40.68 MHz and 433.92 MHz.

4. The method of claim 1, wherein dispensing the adhesive comprises dispensing a thermoplastic adhesive.

5. The method of claim 1, wherein dispensing the adhesive comprises 3D printing the adhesive.

6. The method of claim 1, further comprising forming the filament with a multi-layer coextrusion die.

7. A method for bonding a first layer of material to a second layer of material, the method comprising:
   providing a first electrically conductive plate;
   providing a second electrically conductive plate spaced apart from the first electrically conductive plate wherein the second electrically conductive plate is electrically grounded;
   forming a filament of an adhesive with a multi-layer coextrusion die;
   dispensing the filament on a surface of one of the first and second layers of material, wherein the filament has an electromagnetic susceptor material that when subjected to an electric field heats the adhesive;
   generating a high frequency electrical signal to heat the filament between the first and second electrically conductive plates using a high frequency generator in electrical communication with the first electrically conductive plate; and
   applying pressure to one of the first and second layers of material using a clamping mechanism to maintain contact between one of the first and second layers with the other of the first and second layers.

8. The method of claim 7, wherein providing the first and second electrically conductive plates further comprises providing the first electrically conductive plate parallel with second electrically conductive plate.

9. The method of claim 7, wherein generating the high frequency electrical signal further comprises controlling the high frequency generator to produce a radio frequency selected from the group consisting of 6.78 MHz, 13.56 MHz, 27.12 MHz, 40.68 MHz and 433.92 MHz.

10. The method of claim 7, wherein dispensing the adhesive comprises dispensing a thermoplastic adhesive.

11. The method of claim 7, wherein dispensing the adhesive comprises 3D printing the adhesive.

12. The method of claim 7, wherein the filament has the electromagnetic susceptor material present in a coating on the filament.

* * * * *